US012723940B2

(12) United States Patent
Leuthner et al.

(10) Patent No.: US 12,723,940 B2
(45) Date of Patent: Sep. 1, 2026

(54) DIAPHRAGM SEAL AND PRESSURE MEASURING DEVICE HAVING SUCH A DIAPHRAGM SEAL

(71) Applicant: Endress+Hauser SE+Co. KG, Maulburg (DE)

(72) Inventors: Dietmar Leuthner, Weil am Rhein (DE); Stefan Kropf, Kleines Wiesental (DE); Jens Böckler, Lörrach (DE); Markus Berger, Wehr (DE); Marc Andreas Schlachter, Wehr (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 253 days.

(21) Appl. No.: 18/704,013

(22) PCT Filed: Sep. 22, 2022

(86) PCT No.: PCT/EP2022/076346
§ 371 (c)(1),
(2) Date: Apr. 23, 2024

(87) PCT Pub. No.: WO2023/072488
PCT Pub. Date: May 4, 2023

(65) Prior Publication Data
US 2024/0410774 A1 Dec. 12, 2024

(30) Foreign Application Priority Data
Oct. 26, 2021 (DE) ..................... 10 2021 127 844.9

(51) Int. Cl.
*G01L 19/00* (2006.01)
*G01L 19/06* (2006.01)

(52) U.S. Cl.
CPC ................................ *G01L 19/0046* (2013.01)

(58) Field of Classification Search
CPC ....... G01L 19/0046; G01L 1/02; G01L 19/04; G01L 9/0075; G01L 19/0627;
(Continued)

(56) References Cited

FOREIGN PATENT DOCUMENTS

| | | | |
|---|---|---|---|
| CN | 112345153 | A | 2/2021 |
| DE | 19744208 | C1 | 12/1998 |

(Continued)

*Primary Examiner* — Brandi N Hopkins
(74) *Attorney, Agent, or Firm* — Christopher R. Powers; Endress+Hauser (USA) Holding, Inc.

(57) ABSTRACT

A diaphragm seal includes: a metallic diaphragm seal body; a dividing diaphragm; a dividing diaphragm chamber closed by the dividing diaphragm; a hydraulic channel extending, at least in sections, through the diaphragm seal body and communicating with the dividing diaphragm chamber, wherein the hydraulic channel and the dividing diaphragm chamber are filled with a transmission fluid; a filling channel, communicating with the hydraulic channel; and a closure body, which closes the filling channel, is introduced into the latter with a locating fit, and is welded to the diaphragm seal body, wherein the diaphragm seal body comprises a first material with a first degree of hardness, and the closure body comprises a second material with a second degree of hardness, which differs from the first degree of hardness by at least 10% of the lower one of the two degrees of hardness.

17 Claims, 2 Drawing Sheets

(58) Field of Classification Search
CPC . G01L 19/02; G01L 19/0681; G01L 19/0663; G01L 9/0044; G01L 19/147; G01L 13/02; G01L 19/14; G01L 19/0015; G01L 19/0645; G01L 9/0072; G01L 13/025; G01L 19/0618; G01L 13/026; G01L 7/022; G01L 19/0092; G01L 19/003; G01L 9/0036; G01L 19/0038; G01L 19/142; G01L 7/04; F16C 25/06; F02M 61/08; F02M 51/0603; F16K 11/085; F16K 31/0693; F16K 1/32; B60T 13/14; F17C 13/123; F25B 41/335; F15B 21/008; B05B 12/06; F04B 43/073; B25B 5/065; G01F 1/46
USPC ........................................................ 73/706
See application file for complete search history.

(56) References Cited

FOREIGN PATENT DOCUMENTS

| | | | | |
|---|---|---|---|---|
| DE | 102006020457 A1 | | 11/2007 | |
| DE | 102006040545 A1 | * | 3/2008 | ......... G01L 19/0046 |
| DE | 102011075441 A1 | | 11/2012 | |
| DE | 102011102837 A1 | | 12/2012 | |
| DE | 102017127138 A1 | * | 5/2019 | ......... G01L 19/0046 |
| DE | 102020110728 A1 | | 10/2021 | |
| WO | WO-2008046768 A1 | * | 4/2008 | ......... G01L 19/0663 |

* cited by examiner

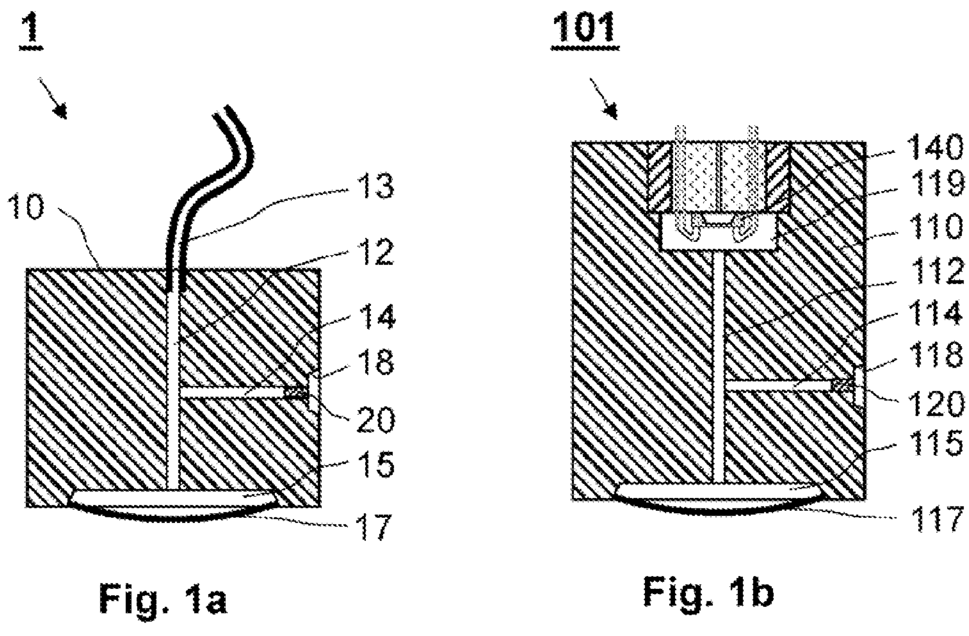
Fig. 1a
Fig. 1b
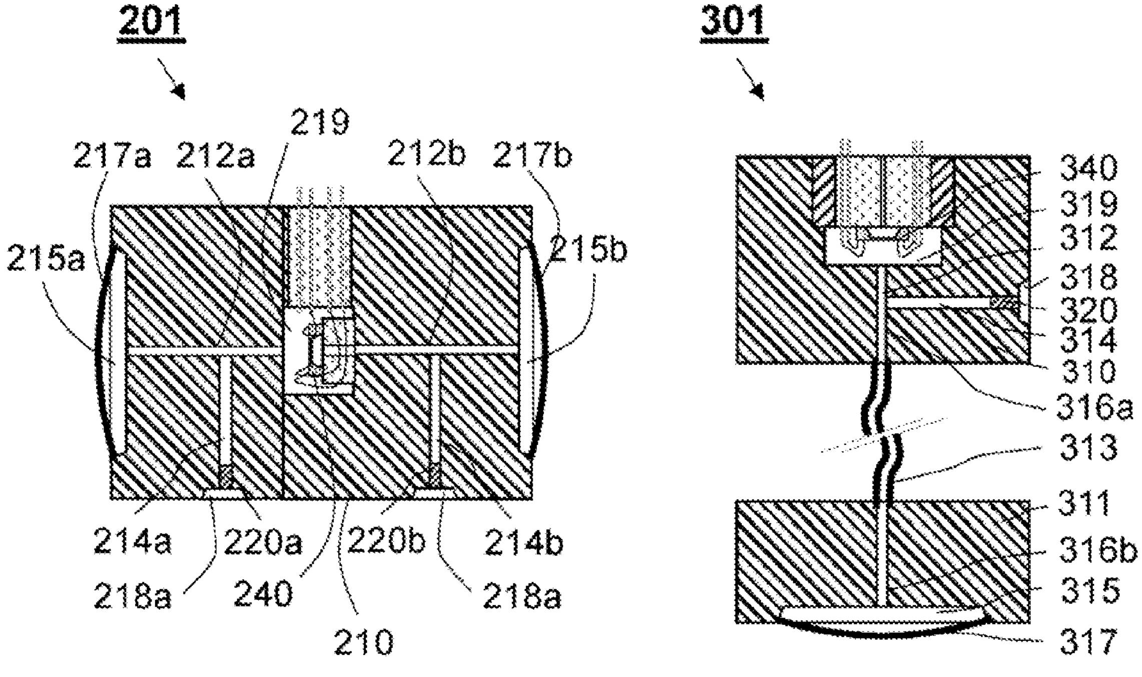
Fig. 1c
Fig. 1d

DIAPHRAGM SEAL AND PRESSURE MEASURING DEVICE HAVING SUCH A DIAPHRAGM SEAL

CROSS-REFERENCE TO RELATED APPLICATIONS

The present application is related to and claims the priority benefit of German Patent Application No. 10 2021 127 844.9, filed Oct. 26, 2021, and International Patent Application No. PCT/EP2022/076346, filed Sep. 22, 2022, the entire contents of which are incorporated herein by reference.

TECHNICAL FIELD

The present invention relates to a diaphragm seal and a pressure measuring device having such a diaphragm seal.

BACKGROUND

Generic diaphragm seals for forwarding a pressure comprise a metal diaphragm seal body, a dividing diaphragm having a first side and a second side which faces away from the first side, wherein the first side of the dividing diaphragm can be loaded with a pressure to be forwarded; a dividing diaphragm chamber which is closed by means of the dividing diaphragm, wherein the second side of the dividing diaphragm faces the dividing diaphragm chamber in order to load the dividing diaphragm chamber with the pressure to be forwarded; a hydraulic channel which communicates with the dividing diaphragm chamber in order to transmit the pressure prevailing in the dividing diaphragm chamber, wherein the hydraulic channel and the dividing diaphragm chamber are filled with a transmission fluid, wherein the hydraulic channel runs through the diaphragm seal body, at least in sections; a filling channel in the diaphragm seal body which communicates with the hydraulic channel; and a closure body which closes the filling channel, wherein the closure body is inserted into the filling channel with a locating fit, in particular a transition fit or an interference fit, and is welded to the diaphragm seal. The specification DE 197 44 208 C1 discloses such a diaphragm seal. It has been found that high temperatures, as can occur during welding of the closure body, require for the long-term stability of the transmission fluid that they not be exposed to excessive temperature during welding of the closure body.

The present invention relates to a diaphragm seal and a pressure measuring device having such a diaphragm seal. Generic diaphragm seals for forwarding a pressure comprise a metal diaphragm seal body, a dividing diaphragm having a first side and a second side which faces away from the first side, wherein the first side of the dividing diaphragm can be loaded with a pressure to be forwarded; a dividing diaphragm chamber which is closed by means of the dividing diaphragm, wherein the second side of the dividing diaphragm faces the dividing diaphragm chamber in order to load the dividing diaphragm chamber with the pressure to be forwarded; a hydraulic channel which communicates with the dividing diaphragm chamber in order to transmit the pressure prevailing in the dividing diaphragm chamber, wherein the hydraulic channel and the dividing diaphragm chamber are filled with a transmission fluid, wherein the hydraulic channel runs through the diaphragm seal body, at least in sections; a filling channel in the diaphragm seal body which communicates with the hydraulic channel; and a closure body which closes the filling channel, wherein the closure body is inserted into the filling channel with a locating fit, in particular a transition fit or an interference fit, and is welded to the diaphragm seal. The specification DE 197 44 208 C1 discloses such a diaphragm seal. It has been found that high temperatures, as can occur during welding of the closure body, require for the long-term stability of the transmission fluid that they not be exposed to excessive temperature during welding of the closure body.

SUMMARY

It is therefore the object of the present disclosure to provide a diaphragm seal and a pressure measuring device having such a diaphragm seal, the production of which reliably avoids excessive temperatures of the transmission fluid. The object is by the diaphragm seal and the pressure measuring device according to the present disclosure.

The invention further develops the generic diaphragm seal in that the diaphragm seal body has a first material with a first degree of hardness, and the closure body has a second material with a second degree of hardness which differs from the first degree of hardness by at least 10% of the lower of the two degrees of hardness. The first material and the second material can also have the same base material, wherein one of the materials has a different treatment state, for example, by Kolsterising® to achieve a higher hardness or by annealing to achieve a lower hardness.

According to a further development of the invention, the degrees of hardness are indicated in Brinell hardness (HB). Due to the different degrees of hardness, a defined deformation of one of the partners of the interference fit can be achieved, whereby the closure body, with displacement of the transmission fluid, can be introduced into the filling channel far enough that overheating of the transmission fluid during the subsequent welding of the closure body can be prevented.

In a further development of the invention, the second degree of hardness is greater than the first degree of hardness. In this way, an even more defined pressing in of the closure body is possible.

In a further development of the invention, the first material comprises an austenitic steel, in particular 1.4404, wherein the second material comprises a martensitic steel, in particular 1.4418.

In a further development of the invention, the second degree of hardness is 266-325 HB, and the first degree of hardness is 149-208 HB.

In a further development of the invention, the closure body is welded to the diaphragm seal body by means of spot welding, in particular pulse welding.

By means of the selected welding methods, the energy input can take place very quickly, which sufficiently limits the heat dissipation for the transfer of transmission fluid to the transmission fluid in order to prevent the overheating thereof.

In a further development of the invention, the spot welding, in particular pulse welding, is carried out with a maximum power of not more than 2 kW, in particular not more than 1.5 kW.

In a further development of the invention, the maximum energy input during welding was not more than 2.5 kJ, in particular not more than 1.8 kJ.

In a further development of the invention, a welding depth of not less than 0.35 mm is achieved by means of spot welding or pulse welding.

In a further development of the invention, the closure body has a substantially cylindrical section over which the interference fit extends, wherein the length of the cylindrical section is not more than 5 mm, in particular not more than 4 mm, and preferably not more than 3.5 mm. According to a further development of the invention, the length of the cylindrical section is not less than 2 mm, in particular not less than 2.5 mm.

The length of the cylindrical section denotes the distance from a front end of the cylindrical section to a rear end of the cylindrical section, wherein the rear end of the cylindrical section can be fused by the welding to the diaphragm seal body. In this case, the thickness of the welded region in the axial direction of the cylindrical section on the circumference of the cylindrical section is to be attributed to the length of the cylindrical section.

In another embodiment of the invention, the closure body in the region of the interference fit has a diameter of not more than 3.0 mm, in particular not more than 2.6 mm, and preferably not more than 2.1 mm.

In a further development of the invention, the closure body has a surface region delimited by the interference fit, which surface region is wetted with the transmission fluid, wherein a maximum temperature in the surface region remains below a decomposition temperature of the transmission fluid during welding of the closure body, so that the transmission fluid is free of thermal decomposition products.

The transmission fluid may comprise, for example, silicone oils, vegetable oils, glycols, propylene glycol, and polyalphaolefins.

The specific temperature value, which depends upon the transmission fluid used, is not determined in the present case. As long as the transmission fluid is free of decomposition products, it can be concluded therefrom that the decomposition temperature has not been reached.

In a further development of the invention, the closure body has a surface region delimited by the interference fit, which surface region is wetted with the transmission fluid, wherein a maximum temperature in the surface region during welding of the closure body was not more than 200° C.

In a further development of the invention, the diaphragm seal body has a contour which is formed in particular by a recess which concentrically surrounds the joint of the closure body. This contour allows a tool to be centered relative to the closure body, wherein the tool in particular comprises a welding electrode.

A diaphragm seal according to the invention can be an independent component for pressure transmission, or it can be integrated into a pressure measuring device for measuring absolute pressure, relative pressure, or differential pressure.

A pressure measuring device according to the invention comprises at least one diaphragm seal according to any of the preceding claims and a pressure measuring transducer, which can be loaded with a pressure to be measured via the hydraulic channel.

BRIEF DESCRIPTION OF THE DRAWINGS

The invention is now explained in more detail on the basis of the exemplary embodiments shown in the figures. In the figures:

FIG. 1*a* shows a schematic, cross-sectional representation of an exemplary embodiment of a diaphragm seal according to the present disclosure;

FIG. 1*b* shows a schematic, cross-sectional representation of an exemplary embodiment of a pressure measuring device according to the invention with a second embodiment of a diaphragm seal according to the present disclosure;

FIG. 1*c* shows a schematic, cross-sectional representation of a second exemplary embodiment of a pressure measuring device according to the invention with a third embodiment of a diaphragm seal according to the present disclosure;

FIG. 1*d* shows a schematic, cross-sectional representation of a third exemplary embodiment of a pressure measuring device according to the invention with a fourth embodiment of a diaphragm seal according to the present disclosure.

DETAILED DESCRIPTION

Figure 2A:
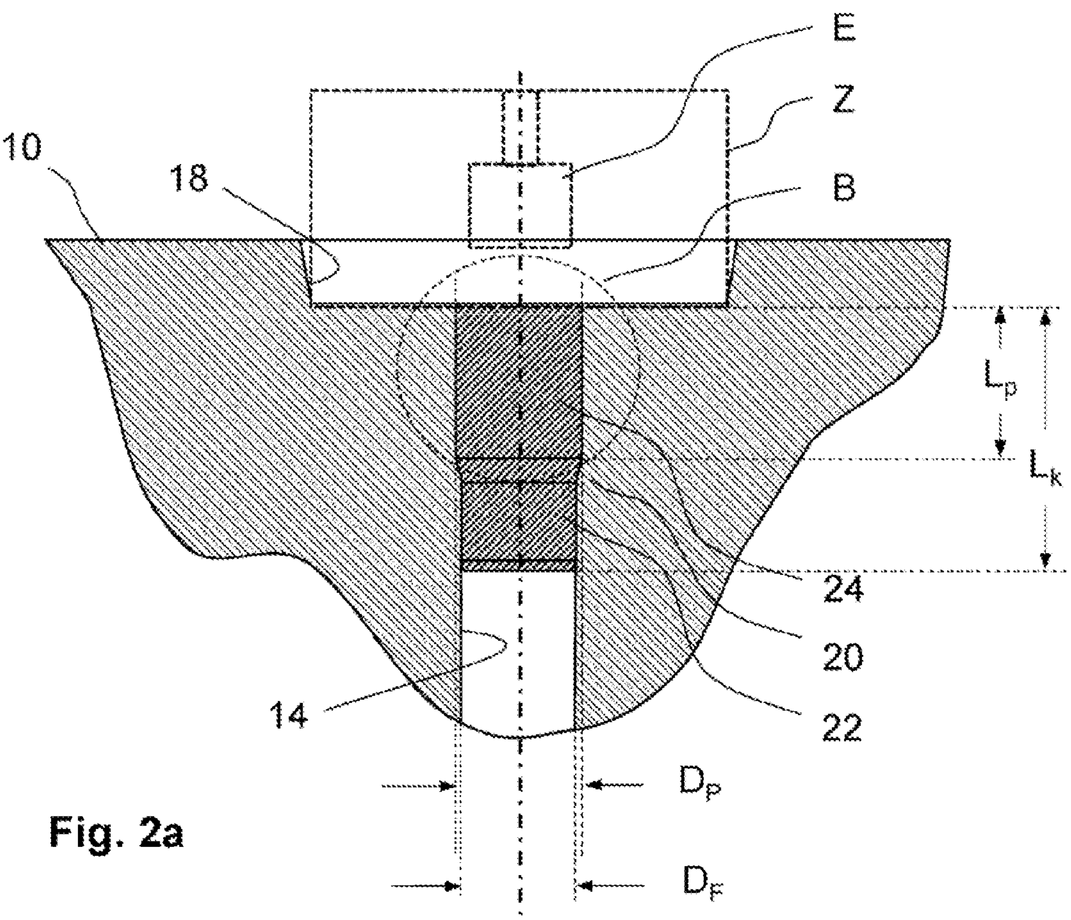
FIGS. 2*a* and 2*b* show detail, cross-sectional views of a closed filling channel of an exemplary embodiment of a diaphragm seal according to the present disclosure.

The exemplary embodiments 1; 101; 201; 301 shown in FIGS. 1*a*, 1*b*, 1*c*, and 1*d* relate to a diaphragm seal as an independent component or a pressure measuring means with integrated diaphragm seals. For easier understanding, in this sequence of drawings, corresponding elements have reference signs with the same two positions.

The embodiment of a diaphragm seal 1 according to FIG. 1*a* comprises in sections a substantially cylindrical, metallic diaphragm seal body 10, through which a bore extends in the axial direction and forms a section of a hydraulic channel 12. The diaphragm seal 1 furthermore has a metallic dividing diaphragm 17, only schematically shown here, which is fastened on the end face to a circumferential joint on the diaphragm seal body 10, whereby, between the diaphragm seal body 10 and the dividing diaphragm 17, a dividing diaphragm chamber 15 is formed into which the hydraulic channel 12 opens. The dividing diaphragm has, for example, a stainless steel of a material thickness of a few tens of μm to 200 μm with a diameter of a few cm. In addition, the dividing diaphragm has an embossed contour (not shown here) in order to increase its volume stroke. The diaphragm seal 1 furthermore has a capillary line 13 which is connected to the axial bore on the end face, facing away from the dividing diaphragm 17, of the diaphragm seal body 10, in order to form a further section of the hydraulic channel 12. For filling the diaphragm seal 1, in particular the hydraulic channel 12 and the dividing diaphragm chamber 15, with a transmission fluid, the diaphragm seal body 10 has a filling channel 14 which extends from a lateral surface of the diaphragm seal body 10 to the hydraulic channel. For the filling operation, the hydraulic channel and the dividing diaphragm chamber can be evacuated via the filling channel in order to then allow a transmission fluid, e.g., a silicone oil, to flow in through the filling channel. The filling channel 14 is closed with a closure body 20 which, after the filling operation, is introduced in an interference fit into the filling channel 24 and welded to the diaphragm seal body by means of pulse welding.

A first exemplary embodiment of a pressure measuring device 101 according to the invention with an integrated diaphragm seal according to FIG. 1*b* comprises a substantially cylindrical, metallic diaphragm seal body 110, into which a bore extends in the axial direction to a sensor chamber 119, wherein the bore forms a hydraulic channel 112. The diaphragm seal furthermore has a metallic dividing diaphragm 117, which is only schematically shown here and is fastened at the end face to a circumferential joint on the diaphragm seal body 110, whereby, between the diaphragm seal body 110 and the dividing diaphragm 117, a dividing diaphragm chamber 115 is formed into which the hydraulic channel 112 opens. The dividing diaphragm has, for example, a stainless steel in a material thickness of a few tens of μm to 200 μm with a diameter of a few cm. In addition, the dividing diaphragm has an embossed contour (not shown here) in order to increase its volume stroke. The pressure measuring device 101 furthermore has a pressure measuring transducer 140—in this case, a piezoresistive semiconductor pressure measuring transducer—which is inserted into the sensor chamber 119 from the end face, facing away from the dividing diaphragm 117, of the diaphragm seal body 110. For filling the diaphragm seal 101, in particular the hydraulic channel 12 of the sensor chamber 119 and the dividing diaphragm chamber 15, with a transmission fluid, the diaphragm seal body 110 has a filling channel 114 which extends from a lateral surface of the diaphragm seal body 110 to the hydraulic channel 112. For the filling operation, the hydraulic channel 112, the sensor chamber 119, and the dividing diaphragm chamber 115 can be evacuated via the filling channel in order to then allow a transmission fluid, e.g., a silicone oil, to flow into the filling channel. The filling channel 114 is closed with a closure body 120 which, after the filling operation, is introduced in an interference fit into the filling channel 124 and is welded to the diaphragm seal body by means of pulse welding.

A second exemplary embodiment of a pressure measuring device 201 according to the invention for measuring pressure differences according to FIG. 1*c* comprises two diaphragm seals in a substantially cylindrical, metallic diaphragm seal body 210, in which a bore in each case extends from both end faces in the axial direction to a sensor chamber 219, wherein the holes each form a hydraulic channel 212*a*, 212*b*. The two diaphragm seals furthermore have, in each case, a metallic dividing diaphragm 217*a*, 217*b*, which is shown only schematically here, which are each fastened to the diaphragm seal body 210 at the end face with a circumferential joint, whereby a dividing diaphragm chamber 215*a*, 215*b* is formed in each case between the diaphragm seal body 210 and the dividing diaphragms 217*a*, 217*b*, into which in each case one of the hydraulic channels 212*a*, 212*b* opens. The dividing diaphragms 217*a*, 217*b* each have, for example, a stainless steel in a material thickness of from a few tens of μm up to 200 μm with a diameter of a few cm. In addition, the dividing diaphragm has an embossed contour (not shown here) in order to increase its volume stroke. The pressure measuring device 201 furthermore has a pressure measuring transducer 240—in this case, a piezoresistive semiconductor pressure measuring transducer—which is inserted into the sensor chamber 219 and is to be loaded with the pressure prevailing in the dividing diaphragm chamber 215*a*, 215*b* located on this side via the hydraulic channels 212*a*, 212*b*, for which purpose the pressure measuring transducer 240 divides the sensor chamber 219 into two parts each of which communicates with one of the hydraulic channels. For filling the diaphragm seals, in particular the hydraulic channel 212*a*, 212*b*, the sensor chamber 219, and the dividing diaphragm chambers 215*a*, 215*b*, with a transmission fluid, the diaphragm seal body 210 has two filling channels 214*a*, 214*b*, each of which extends from a lateral surface of the diaphragm seal body 210 to one of the hydraulic channels 212*a*, 212*b*. For filling, the hydraulic channels 212*a*, 212*b*, the sensor chamber 219, and the dividing diaphragm chambers 215*a*, 215*b* can be evacuated via the filling channels 214*a*, 214*b* in order to then allow a transmission fluid, e.g., a silicone oil, to flow in each case through the filling channels. The filling channels 214*a*, 214*b* are each closed with a closure body 220*a*, 220*b*, which, after the filling operation, is introduced in an interference fit into one of the filling channels 214*a*, 214*b* and is welded to the diaphragm seal body by means of pulse welding.

A third exemplary embodiment of a pressure measuring device 301 according to the invention with an integrated diaphragm seal according to FIG. 1*d* comprises a substantially cylindrical, metallic diaphragm seal body 310, into which a bore 316*a* extends in the axial direction to a sensor chamber 319 in the diaphragm seal body 310, wherein the bore forms a section of a hydraulic channel 312. The pressure measuring device 301 furthermore has a substantially cylindrical, metallic dividing diaphragm chamber body 311 through which an axial bore 316*b* extends, which is hydraulically connected to the bore 316*a* in the axial direction by the diaphragm seal body 310 via a capillary line 313 in order to form a hydraulic channel 312.

The pressure measuring device 301 furthermore has a metallic dividing diaphragm 317, which is only schematically shown here, which is fastened at the end face to a circumferential joint at the dividing diaphragm chamber body 311, whereby, between the dividing diaphragm chamber body 311 and the dividing diaphragm 317, a dividing diaphragm chamber 315 is formed into which the hydraulic channel 312 opens. The dividing diaphragm has, for example, a stainless steel in a material thickness of some 30 μm to 200 μm with a diameter of a few cm. In addition, the dividing diaphragm has an embossed contour (not shown here) in order to increase its volume stroke. The pressure measuring device 301 furthermore has a pressure measuring transducer 340—in this case, a piezoresistive semiconductor pressure measuring transducer—which is inserted into the sensor chamber 319 from the end face, remote from the capillary line 313, of the diaphragm seal body 310. For filling the diaphragm seal 301, in particular the hydraulic channel 312 of the sensor chamber 319 and the dividing diaphragm chamber 35, with a transmission fluid, the diaphragm seal body 310 has a filling channel 314 which extends from a lateral surface of the diaphragm seal body 310 to the hydraulic channel 312. For the filling operation, the hydraulic channel 312, the sensor chamber 319, and the dividing diaphragm chamber 315 can be evacuated via the filling channel in order to then allow a transmission fluid, e.g., a silicone oil, to flow into the filling channel. The filling channel 314 is closed with a closure body 320, which, after the filling operation, is introduced in an interference fit into the filling channel 324 and welded to the diaphragm seal body by means of pulse welding.

In all exemplary embodiments, the diaphragm seal bodies 10; 110; 210; 310 around the closure body 20; 120; 210*a*, 220*b*; 320 have a contour 18; 118; 210*a*, 218*b*; 318, which is formed in particular by a recess and serves for the positioning of a tool, in particular for positioning a welding electrode when the filling channel is closed.

Figure 2B:
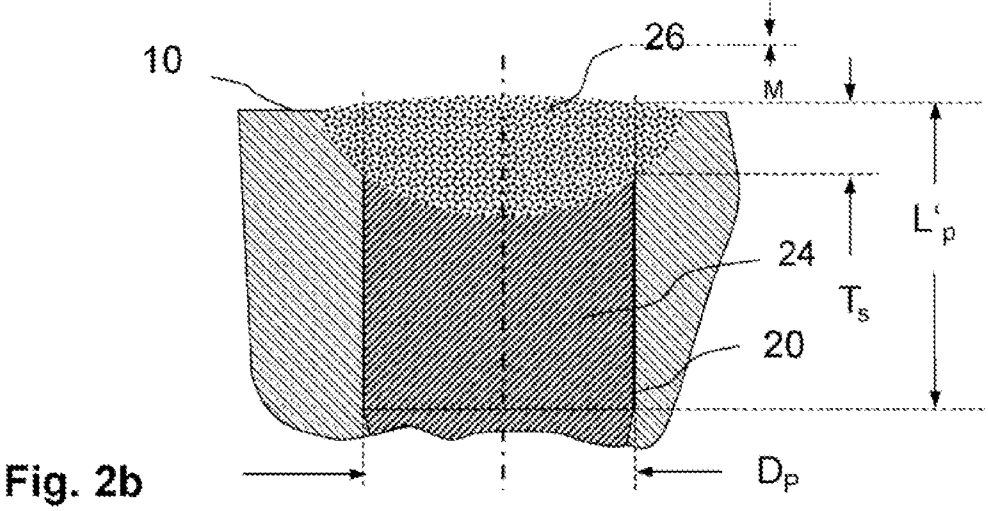

Details for closing the filling channel are now explained with reference to FIGS. 2*a* and 2*b*, wherein the reference signs used correspond to the embodiment according to FIG. 1*a*. However, the following explanations apply to all exemplary embodiments of the invention. The filling channel 14 extends from a surface of the diaphragm seal body 10 into the interior thereof, wherein the diaphragm seal body 10 has a contour 18 in the surroundings of the filling channel, which contour is formed by the edge of a depression in the surface of the diaphragm seal body, and which in particular coaxially surrounds the opening of the filling channel 18. The filling channel has a diameter $D_F$ which can be a few mm—for example, not more than 2.5 mm. After filling the diaphragm seal with transmission fluid, a metallic closure body 10, which is cylindrical in sections, is introduced into the filling channel 14 and has a length $L_K$ of not more than 10 mm—for example, about 6 mm. The closure body 20 with a total length $L_K$ has a cylindrical guide section 22, the diameter of which is not greater than the diameter $D_F$ of the filling channel 14 and in particular is equal to the diameter $D_F$ of the filling channel 14, so that the guide section can easily be inserted, in particular in a clearance fit, into the filling channel. The closure body furthermore has a rear-side pressing section 24, the diameter $D_P$ of which is greater than the diameter $D_F$ of the filling channel. With a diameter $D_F$ of the filling channel of 2.00 mm, the diameter $D_P$ of the pressing section 24 can, for example, be 2.05 mm. In this respect, the pressing section 24 can be introduced into the filling channel 24 only in an interference fit. In this case, all the transmission fluid which remained on the wall of the filling channel 24 after the filling operation is reliably displaced in the region of the interference fit, but it cannot be ruled out that, in the region of the guide section 22, transmission fluid is still present on the walls of the filling channel or the lateral surface of the closure body 20. In order to protect the transmission fluid, the decomposition temperature thereof must not be reached there during the welding of the closure body. For this purpose, on the one hand, the length $L_P$ of the pressing section 24 can be kept as large as possible, wherein limits are set for this parameter, because, firstly, the energy consumption for pressing the closure body increases with the length of the interference fit, and, secondly, the length of the filling channel and the entire material requirement for the diaphragm seal increases. On the other hand, the energy input during welding can be optimized. In the present case, both starting points are used.

By using steels with different hardnesses for the diaphragm seal body 10 and the closure body 20, the closure body is pressed with a defined deformation of the less hard component. A sufficient length $L_P$ of the interference fit can thus be reproducibly achieved. In the present case, the closure body 20 has a martensitic steel, in particular 1.4418, which is harder than an austenitic steel, in particular 1.4404, which is used for the diaphragm seal body 10.

The welding of the closure body 20 to the diaphragm seal body 10 is also carried out by spot welding, in particular pulse welding with a single short energy input, which melts the joining partners for the required welding depth $T_S$ of, for example, 0.35 mm for a pressure-bearing closure, before too much energy has flowed away by heat conduction. The power during welding in the welding path is, for example, approximately 600 W at a power input of approximately 2.5 s.

In order to ensure good reproducibility in the manufacturing process, precise centering and spacing of a welding electrode with respect to the pressed-in closure body 14 is required. For this purpose, a ceramic, rotationally symmetrical centering device Z indicated in FIG. 2*a* is used, which device rests with its lateral surface against the contour 18 and positions the welding electrode at a defined distance of about 1.5 mm. The result of the welding is shown in FIG. 2*b*, which schematically shows a region, marked with B in FIG. 2*a*, after the welding process. It can be seen therein that material of the closure body 20 and of the diaphragm seal body 10 is fused together in a region 26 which adjoins the rear end face of the closure body 26.

The closure body 20 and the diaphragm seal body 10 are thereby connected to one another with a welding depth $T_S$ in a pressure-bearing manner, wherein the welding depth denotes the weakest connection between the joining partners that can be measured at the diameter $D_P$ of the pressing section 24. A subsequent measurement of the length $L_P$ of the pressing section 24, e.g., in a sectional view, proves to be difficult insofar as the rear region of the pressing section 24 is fused with material of the diaphragm seal body 10, and the solidified material optionally has a meniscus. At the diameter $D_P$ of the pressing region, a final length $L'_P$, changed by the thickness M of the meniscus, of the pressing region is thus measured. However, based upon the shape of the meniscus and the value of the final length $L'_P$ of the pressing section, the length $L_P$ of the pressing section 24 can be determined which defines the distance of the transmission fluid from the rear side of the closure body 10 at the beginning of the welding process, and thus to a certain extent a thermal safety distance for the transmission fluid. The length $L_P$ of the pressing section is at least 1.5 mm, not more than 5 mm, and, for example, 3 mm. In combination with the described welding method, thermal decomposition of the transmission fluid during closing of the diaphragm seal is thereby reliably prevented.

The invention claimed is:

1. A diaphragm seal for hydraulic forwarding of a pressure, the diaphragm seal comprising:

- a metallic diaphragm seal body;
- a dividing diaphragm including a first side and a second side facing away from the first side, wherein the first side of the dividing diaphragm configured to be loaded with the pressure to be forwarded;
- a chamber, which is closed on a side by the dividing diaphragm, wherein the second side of the dividing diaphragm faces the chamber as to load the chamber with the pressure to be forwarded;
- a hydraulic channel in communication with the chamber as to transmit the pressure prevailing in the chamber, wherein the hydraulic channel and the chamber are filled with a transmission fluid, and wherein the hydraulic channel extends, at least in a section, through the diaphragm seal body;
- a filling channel in the diaphragm seal body, the filling channel in communication with the hydraulic channel; and
- a closure body configured to close the filling channel, wherein the closure body is disposed in the filling channel with a locating fit and is welded to the diaphragm seal body, wherein the diaphragm seal body comprises a first material with a first degree of hardness, and the closure body comprises a second material with a second degree of hardness, which differs from the first degree of hardness by at least 10% of the lower one of the first and second degree of hardness.

2. The diaphragm seal according to claim 1, wherein the second degree of hardness is greater than the first degree of hardness.

3. The diaphragm seal according to claim 1, wherein the first material comprises an austenitic steel, and wherein the second material comprises a martensitic steel.

4. The diaphragm seal according to claim 3, wherein the austenitic steel of the first material is grade 1.4404, and wherein the martensitic steel of the second material is 1.4418.

5. The diaphragm seal according to claim 1, wherein the second degree of hardness is 266-325 HB, and the first degree of hardness is 149-208 HB.

6. The diaphragm seal according to claim 1, wherein the closure body is welded to the diaphragm seal body by spot welding.

7. The diaphragm seal according to claim 1, wherein the closure body is welded to the diaphragm seal body by pulse welding.

8. The diaphragm seal according to claim 1, wherein the welding is performed at a maximum power of not more than 2 kW.

9. The diaphragm seal according to claim 1, wherein the energy input during the welding is not more than 2.5 kJ.

10. The diaphragm seal according to claim 1, wherein a welding depth of the welding is not less than 0.35 mm.

11. The diaphragm seal according to claim 1, wherein the closure body includes a substantially cylindrical section over which the locating fit extends, wherein a length of the cylindrical section is not more than 5 mm.

12. The diaphragm seal according to claim 1, wherein the closure body in a region of the locating fit has a diameter of not more than 3.0 mm.

13. The diaphragm seal according to claim 1, wherein the closure body includes a surface region delimited by the locating fit, which surface region is wetted with the transmission fluid, wherein a maximum temperature in the surface region during the welding of the closure body remains below a decomposition temperature of the transmission fluid such that the transmission fluid is free of thermal decomposition products from the welding.

14. The diaphragm seal according to claim 1, wherein the closure body includes a surface region delimited by the locating fit, which surface region is wetted with the transmission fluid, wherein a maximum temperature in the surface region during the welding of the closure body is not more than 200° C.

15. The diaphragm seal according to claim 1, wherein the diaphragm seal body includes a recess, which concentrically surrounds a joining interface with the closure body.

16. The diaphragm seal according to claim 1, wherein the locating fit of the closure body to the filling channel is a transition fit or an interference fit.

17. A pressure measuring device, comprising: at least one diaphragm seal according to claim 1; and a pressure measuring transducer configured to be loaded with the pressure to be measured via the hydraulic channel.

* * * * *